United States Patent Office

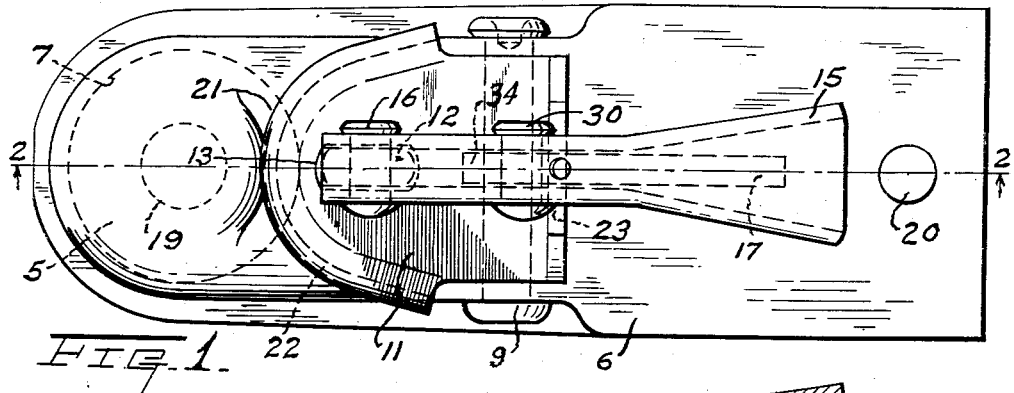
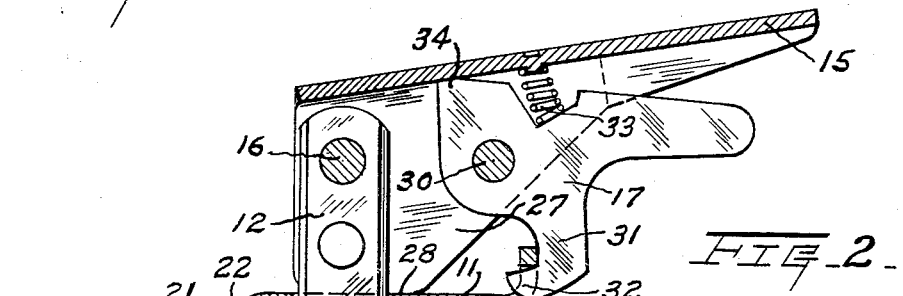# 
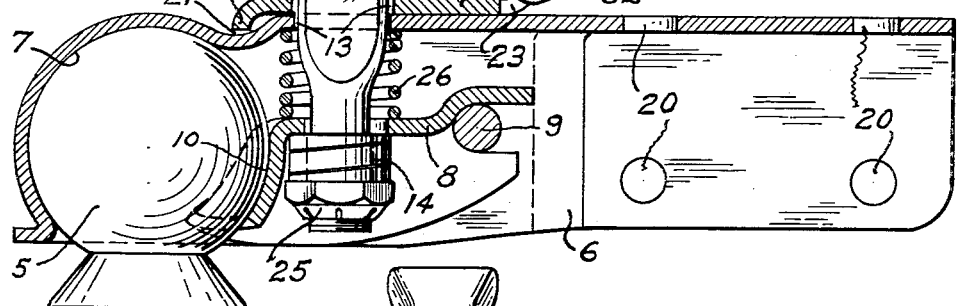
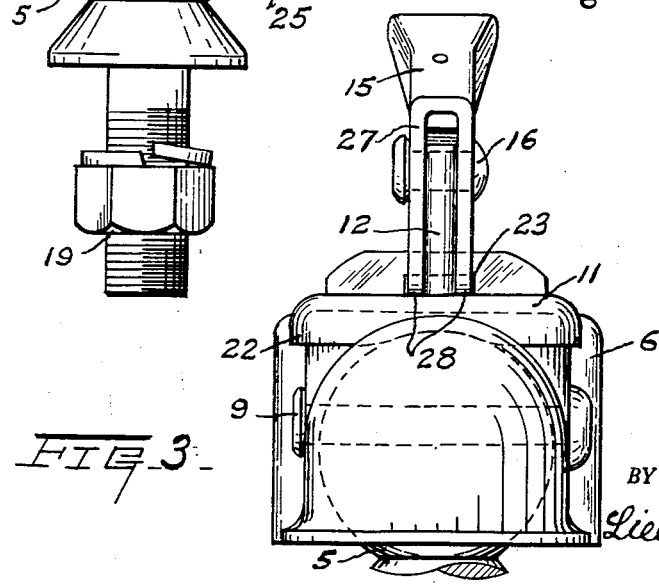

2,971,777
Patented Feb. 14, 1961

2,971,777

TRAILER COUPLING

Bernard R. Weber and William H. Lieber, Wauwatosa, Wis., assignors to The Fulton Company, Milwaukee, Wis., a corporation of Wisconsin Filed Feb. 19, 1960, Ser. No. 9,818

3 Claims. (Cl. 280—512)

The present invention relates generally to improvements in couplings for attaching trailers to transporting vehicles, and it relates more specifically to improvements in the construction and operation of trailer couplings of the ball and socket type provided with latch mechanism for locking the ball member within the socket member when the coupling is in use.

The principal object of the invention is to provide a ball and socket trailer coupling of durable structure which is positively locked in assembled condition but may be conveniently disconnected.

As shown in U.S. Patent No. 2,170,980, dated August 29, 1939, it has heretofore been proposed to provide a ball and socket trailer coupling in which the ball member is normally confined within the socket member by a ball retainer adapted to be released by means of a cam lever coacting with the socket member and with one end of a rod the opposite end of which coacts with the retainer. In this patent the cam lever and the rod which connects it with the ball retainer are provided with openings adapted to be alined when the lever is in ball retaining position and to which a pad lock may be applied manually in order to positively prevent unauthorized separation of the ball and socket members.

While this prior patented coupling was entirely satisfactory and successful during normal operation, it required the use of a key in order to positively lock the coupling members in ball retaining position and this method of locking the members together involved the possible loss or displacement of the releasing key. In order to avoid such difficulty, numerous so-called automatic safety latches have since geen proposed, and while these latches do not prevent unauthorized release of the coupling members, they do eliminate the use of a pad lock and key in order to insure positive interlocking of the coupling members.

However, all of these prior proposed automatic safety latches are objectionable either because they were too complicated and unreliable, or because they required extreme accuracy in the construction of the rod connecting the cam lever with the retainer, or because the safety latch was not protectively concealed against accidental release during normal use of the coupling, or because the safety latch could not be applied to existing couplings of the same general type.

It is therefore an important object of the present invention to provide an improved safety latch assemblage for ball and socket couplings of the general type shown in the above identified patent, which obviates all of the above mentioned objectionable features involved in the prior cam lever locking devices.

Another important object of this invention is to provide a simple but highly effective safety latch for such trailer couplings, which is extremely reliable in operation and which also functions automatically to lock the ball and socket members together while being conveniently releasable.

A further important object of the invention is to provide an improved automatic safety latch device for couplings having a ball retainer movably suspended from the socket member and operable by a cam lever coacting with a connecting rod, wherein no accurate machining or notching of the rod is required in order to cooperate with the latch.

Still another important object of the present invention is to provide an improved ball coupling safety latch which is protectively concealed within other structure so that this latch will not be readily released by impact with external obstructions.

An additional important object of this invention is to provide a combined cam lever and safety latch unit, which may be applied as such to ball and socket trailer couplings of the general type shown in the above identified patent.

These and other more specific objects and advantages of the invention will be apparent from the following description.

A clear conception of the features constituting the present improvement, and of the construction and operation of a practical ball and socket coupling embodying the invention may be had by referring to the drawing accompanying and forming a part of this specification wherein like reference characters designate the same or similar parts in the various views.

Fig. 1 is a top view of one of the improved couplings showing the parts in normal interconnected and latched condition;

Fig. 2 is a central longitudinal vertical section through the coupling of Fig. 1, taken along the line 2—2 but showing the ball member, the retainer actuating rod, and the locking latch in elevation; and Fig. 3 is a front end elevation of the same coupling, but with the lower portion of the ball member broken away.

While the invention has been shown and described herein as having been embodied in a ball and socket type of trailer coupling formed primarily of sheet metal and especially adapted for use in connecting a trailer to an automobile, it is not intended to limit the same to such a structure or use; and it is also contemplated that specific descriptive terms employed herein be given the broadest possible interpretation consistent with the disclosure.

The improved trailer coupling shown in the drawing, comprises in general, a ball member 5; a socket member 6 provided with an internal spherical zone surface 7 snugly engageable with the front and sides of the ball member 5; a ball retainer 8 swingably suspended from a transverse pin 9 secured to the socket member 6 and having a spherical zone surface 10 cooperable with the rear of the ball member 5 to hold it against the socket surface 7; a bearing plate 11 externally engaging the top of the socket member 6; a rod 12 extending upwardly through alined openings 13 in the top of the socket member 6 and in the plate 11, and having its lower end cooperable with the retainer 8 through a spring 14; a cam lever 15 swingably attached to the upper rod end by a pivot 16 and coacting with the plate 11 to swing the retainer into active position; and a latch 17 carried by the cam lever 15 and being engageable with the bearing plate 11 to lock the lever 15, rod 12 and retainer 8 in ball confining position.

The ball and socket members 5, 6, retainer 8, bearing plate 11, cam lever 15, and latch 17 may all be formed of sheet metal, and the ball member 5 is provided with a rigid bolt 19 for attaching this member to a hauling vehicle. The socket member 6 is provided with a rear inverted channel portion provided with holes 20 for effecting attachment of this member to the draft tongue of a trailer, and the top of the socket member 6 has an arcuate recess 21 therein preferably extending laterally beyond the opposite sides of the openings 13 in the member 6 and plate 11. The bearing plate 11 has a similarly arcuate depending stiffening lip 22 at its front and side portions which is cooperable with the external socket member recess 21 and the rear of the bearing plate 11 is provided with an integral upstanding projection having an opening 23 therein which also serves to stiffen the bearing plate structure.

The pivot pin 9 about which the ball retainer 8 is swingable is firmly secured to the side walls of the socket member 6, and the lower end of the rod 12 is threaded and provided with an adjustable nut 25 while the relatively strong main coil spring 14 is interposed between this nut and the bottom of the retainer 8 and functions to snugly confine the sphere of the ball member 5 between the socket surface 7 and the retainer surface 10 when the coupling is assembled for normal use. Another somewhat lighter coil spring 26 may be interposed around the rod 12 between the top of the retainer 8 and the top wall of the socket member 6, and this auxiliary spring serves to swing the retainer away from the ball member 5 when the cam lever 15 is swung into release position. The upper outer portion of the connecting rod 12 is flattened, and the cam lever 15 is provided with spaced depending side walls 27 having cam surfaces 28 at their lower edges cooperable with the top of the bearing plate 11, while the pivot 16 swingably attaches the lever walls 27 to the flattened rod end.

The latch 17 for locking the cam lever 15 into ball retaining position within the socket member 6 is an important feature of the present invention. This latch is swingably suspended from a pivot pin 30 secured to the side walls 27 of the lever 15 remote from the rod 12, and has its manipulating handle disposed closely adjacent to and beneath the handle of the cam lever 15 when the latter is placed in active position as in Fig. 2. The latch 17 has an integral arm 31 provided with a hook 32 adapted to engage the opening 23 in the rear upstanding projection of the wear plate 11, and a helical spring 33 is interposed between the latch 17 and the lever 15 and functions to constantly urge the latch in a clockwise direction about its pivot pin 30. The latch 17 is also provided with an abutment 34 which is engageable with the cam lever 15 to limit the swing of the latch which can however be released from the wear plate 11 by pressing the latch and lever handles together.

When the improved ball and socket coupling has been properly constructed as described, and the ball member 5 has been firmly attached to a hauling vehicle and the socket member has been likewise attached to the draft tongue of a trailer, the trailer may be readily connected to the vehicle by releasing the latch 17 from the wear plate 11 and by thereafter swinging the cam lever 15 into substantially upright position. The lighter spring 26 assisted by gravity will then swing the retainer 8 about the pivot 9 away from the socket member surface 7 a distance sufficient to permit the coupling member 6 to be lowered so as to receive the ball of the member 5. With the parts thus positioned, the cam lever 15 may be swung rearwardly and downwardly about the pin 16 causing the hook 32 of the latch 17 to approach and eventually snap into locking engagement with the wear plate opening 23. This latching action takes place automatically and with a snap action under influence of the spring 33.

This rearward and downward swinging of the cam lever 15 causes the rod 12 to move upwardly through the openings 13 and to compress both springs 26, 14 and with the nut 25 properly adjusted, the heavier spring 14 will thereafter press the retainer surface 10 against the ball of the member 5 and forcing this ball into snug engagement with the socket member surface 7. The coupling will then be in operative condition, but it may be quickly disconnected by merely pressing the handles of the latch 17 and cam lever 15 together and by thereafter swinging the latter upwardly and forwardly whereupon the retainer 8 will be released and the coupling member 6 may be lifted freely from the ball.

From the foregoing description of the construction and functioning of the device, it will be apparent that the present invention in fact provides a ball and socket type of trailer coupling in which the ball is automatically and effectively locked within the socket but may be conveniently released when it becomes desirable to disconnect the coupling members 5, 6. The improved latching mechanism does not require the provision of extra latching formations in the socket member 6 with special dies, since the latch assembly is positively connected only to the cam lever 15 and may be applied as a unit to couplings embodying a recess 21 and a cam lever 15 without the necessity of accurately notching the outer end of the rod 12 as in prior self latching couplings. The latch 17 of the present improved coupling is readily manipulable but is also effectively concealed and protected against accidental release by impact with external obstructions since it is confined within the cam lever 15 remote from the rod 12.

Various modes of carrying out the invention are contemplated as being within the scope of the following claims particularly pointing out and distinctly claiming the subject matter which is regarded as the invention.

We claim:

1. A trailer coupling comprising, a ball member, a socket member formed to coact with said ball member and being provided with a flat top having an external transverse recess therein, a ball retainer movably suspended from said socket member, a bearing plate loosely mounted upon said socket member and having a lip at one end engageable with said recess to prevent shifting of the plate relative to the socket member and also having an upstanding flange at its opposite end, a rod extending through said socket member and the medial portion of said plate and having its inner end cooperable with said retainer to move the later, a cam lever secured to the outer end of said rod and having cam surfaces coacting with said plate to press said plate against said socket member top and to move the rod, and a latch movably suspended from said lever and being latchingly engageable with said bearing plate flange to lock said members together.

2. A trailer coupling comprising, a ball member, a socket member, formed to coact with said ball member and being provided with an integral top having an external arcuate recess therein, a ball retainer swingably suspended from said socket member, a bearing plate loosely mounted upon said socket member top and having an integral arcuate lip at one end engageable with said recess to prevent shifting of the plate relative to the socket member, a rod extending through said socket member and the medial portion of said plate and having its inner end cooperable with said retainer to move the latter, a cam lever pivotally secured to the outer end of said rod and having cams coacting with said plate to press the same against said socket member top and to reciprocate the rod, and a latch pivotally suspended from said lever and having a hook latchingly engageable with the opposite end of said bearing plate to lock said members together, said lever and latch cooperating so that no portion of the latter projects beyond the top of the former.

3. A trailer coupling comprising, a ball member, a socket member formed to coact with said ball member and having an integral top provided with an external transverse recess, a ball retainer movably suspended within said socket member, a bearing plate resting upon said socket member top and having an integral depending lip at one end coacting with said recess to prevent shifting of the plate relative to the socket member, said plate also having an integral upstanding flange at its opposite end, a retainer actuating rod extending upwardly through said socket member top and the medial portion of said plate, a cam lever pivotally secured to the upper end of said rod and having spaced side walls spanned by a handle and provided with cam surfaces coacting with said plate to hold said retainer in ball engagement when said handle is in approximately horizontal position, and a latch pivotally suspended between said lever side walls and having a hook latchingly engageable with said plate flange to lock said members together, said latch being disposed entirely beneath the top of said lever handle whenever said members are locked together.

References Cited in the file of this patent

UNITED STATES PATENTS

| | | |
|---|---|---|
| 2,326,466 | Kitterman | Apr. 10, 1943 |
| 2,726,099 | Nunn | Dec. 6, 1955 |

FOREIGN PATENTS

| | | |
|---|---|---|
| 710,466 | Germany | Sept. 13, 1941 |